United States Patent [19]

Guilloteau

[11] Patent Number: 4,510,832
[45] Date of Patent: Apr. 16, 1985

[54] ROTARY DEVICE FOR SHEARING A BUNDLE OF TUBES CONTAINING BURNT NUCLEAR FUELS

[75] Inventor: René Guilloteau, Verrieres Le Buisson, France

[73] Assignee: Societe Generale pour les Techniques Nouvelles S.G.N., Montigny-Le-Bretonneux, France

[21] Appl. No.: 361,285

[22] Filed: Mar. 24, 1982

[30] Foreign Application Priority Data

Mar. 24, 1981 [FR] France ............................... 81 05880

[51] Int. Cl.³ .......................... B26D 1/25; B26D 1/34; B26D 1/38; B26D 3/16
[52] U.S. Cl. ..................................... 83/168; 83/282; 83/356; 83/356.3; 83/925 R
[58] Field of Search ..................... 83/356.3, 355, 350, 83/925 R, 168, 673, 674, 281, 282, 409.2; 277/1, 3, 12, DIG. 4

[56] References Cited

U.S. PATENT DOCUMENTS

| 3,273,899 | 9/1966 | Warnery | 277/3 |
| 3,621,742 | 11/1971 | Kendall | 83/925 R |
| 3,722,338 | 3/1973 | Cherel | 83/925 R |
| 4,091,699 | 5/1978 | Chaze et al. | 83/925 R |
| 4,095,495 | 6/1978 | Chaze et al. | 83/925 R |

*Primary Examiner*—E. R. Kazenske
*Assistant Examiner*—Taylor Ross
*Attorney, Agent, or Firm*—Scrivener Clarke Scrivener and Johnson

[57] ABSTRACT

A bundle of tubes filled with nuclear fuel is positioned in a machine with the lower end of the bundle adjacent a first rotary cutter which is operated to sever the lower ends of the tubes after which the bundle is moved to a position adjacent a second rotary cutter where the tubes are cut into short lengths by teeth carried by a second rotary cutter.

10 Claims, 6 Drawing Figures

ROTARY DEVICE FOR SHEARING A BUNDLE OF TUBES CONTAINING BURNT NUCLEAR FUELS

SUMMARY OF THE INVENTION

A machine for cutting off the ends of tubes filled with nuclear material and then cutting the tubes into short lengths comprises a magazine for receiving a bundle of vertical tubes and moving them to a first position where their lower ends are engaged and cut off by co-operating rotary cutters after which the magazine is operated to move the bundle to a second position at which short lengths of the lower ends of the tubes are progressively engaged and cut off by teeth formed on the rotary cutter and arranged in a circumferential series of staggered pairs. The part of the machine having the tubes is isolated from the other parts of the machine by flanges and the introduction of gas.

The present invention relates to a rotary device for shearing a bundle of tubes containing burnt nuclear fuels.

The bundles of tubes which contain the fuels burnt in an atomic cell are, after spending some time in a reactor, cut into small elements in order to facilitate subsequent physiochemical operations (such as for example, dissolving) with a view to re-processing the fuels.

The object of the present invention is to provide a device permitting these bundles of tubes to be cut in safe and reliable conditions which are clearly improvements over the currently used or previously described devices.

According to a previously described solution, the bundles of tubes are cut with a cutter of rectilinear stroke such as that mentioned in French Pat. No. 2 324 094. The device described in said document comprises cutting means, means for positioning and vertically displacing the bundle of tubes between each cutting operation, and die-cushions for holding the tubes to be cut in position. The cutting means are composed:

on the one hand of a cutter and means for displacing same, on the other hand, of a counter-cutter.

Said French patent also indicates that it is possible to use a circular blade.

It was first found that the bundles of tubes could be advantageously cut by using a cutting device driven by a low-speed motor, i.e. about 1 a, namely about 10 revs per minute, but with a high driving torque, i.e. between about 0.5 and 1 MegaNewton/meter.

it was then found that it is necessary to carefully separate the part of the device according to the invention which is in contact with the radioactive fuel from the part of the device where the motor is situated. This separation can be effected by combining the use of joints with a suitable circulation of gas.

In addition, the cutting device can advantageously be constituted by a rotor carrying staggered teeth formed on the circumference of the rotor. Said teeth are either formed by protuberances on the rotor, or by a suitably-shaped notch, cut into the rotor. It is essential for the teeth to be disposed symmetrically with respect to the axis of the bundle to be cut and for said bundle to be continually attacked by the teeth which face the external edges of the said bundle.

Finally, since it is an advantage that the cutting device should be able to cut the bundles of tubes as well as the bottoms or feet of these bundles, the device according to the invention has been so designed that it has on one end of the teeth-carrying rotor for cutting the bundles, a blade which is driven by the same motor for cutting off the ends of the tubes of the bundle. The bundle can thus move, with a translation movement or with a pivoting movement about a vertical axis, and be brought successively above the foot-cutting blade, and then above the teeth-carrying rotor for shearing the tubes into short lengths.

The machine according to the present invention has been designated by the term "shears" for simplifcation purposes and better comprehension of the invention.

The present invention will be more readily understood on reading the following description with reference to the accompanying drawings in which.

EXAMPLE 1

Figure 1:
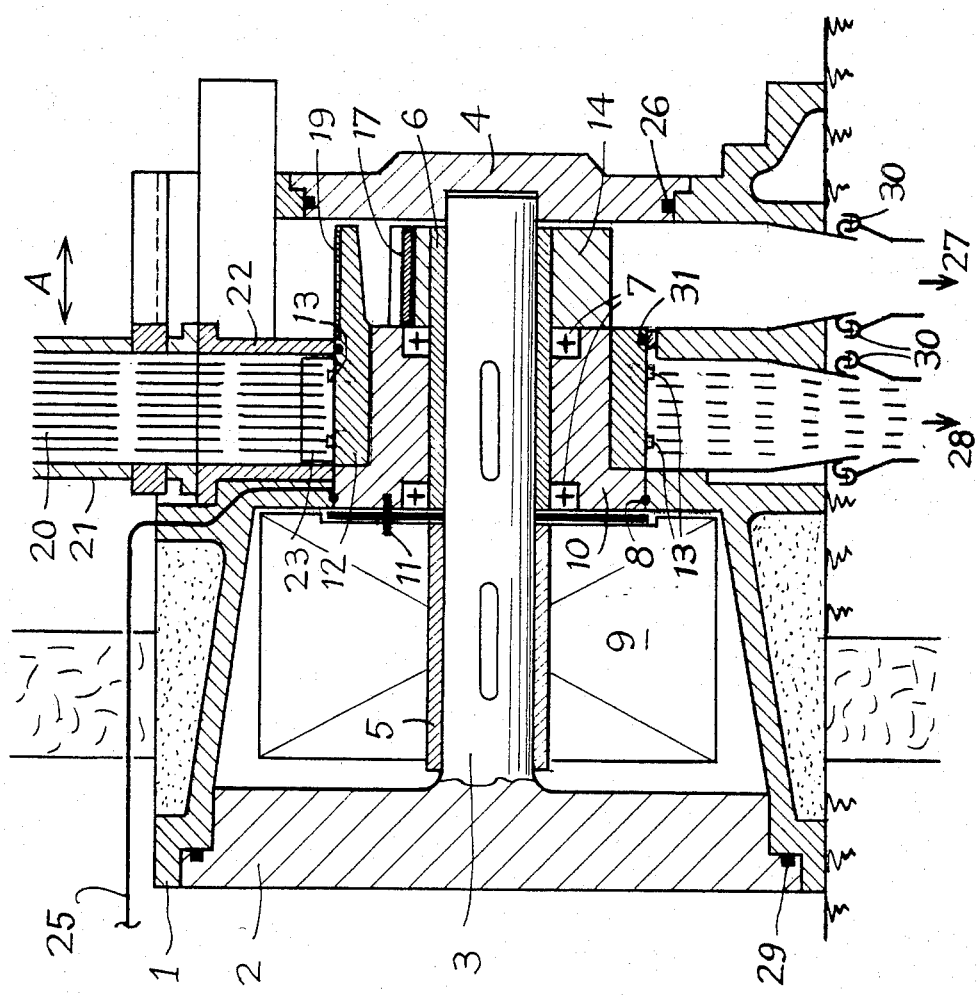
FIG. 1 is a vertical section of a first embodiment of the shears wherein the ball races are situated on the cutting side.

Description of a first embodiment of the shears according to the present invention The shears are composed of a frame 1 closed on one side by a gate 2 to which is secured the horizontal shaft 3. The other end of the frame is closed by a gate 4 in which the shaft is journaled.

On the shaft 3 are placed the sleeves 5 and 6. A motor 9 (hydraulic for example) or a set of motors runs on sleeve 5. The running speed of this motor is adjustable between 1 and 10 RPM. The total torque should be between 0.5 and 1 MegaNewton/meter.

Two ball races 7 are mounted on the sleeve 6. The rotor 10 is driven in rotation about said ball races by the motor 9 through one or more studs 11.

A tight joint is mounted between the rotor 10 and the frame 1. The cutter-bar 12, carrying the staggered teeth 13 and the axially extending cutting tooth 19, is secured concentrically on the rotor 10. Said staggered teeth are provided to cut the tubes of the bundle, whereas the tooth 19 only cuts the foot of the bundle.

The teeth 13 can be cut into the cutter-bar 12 or formed separately and secured thereon by, for example, screws (not shown). A ring 14 is mounted on the sleeve 6 internally of the cutter-bar 12. The means provided to secure the different rortary parts together are not shown. One solution can be, for example, grooves between the parts 10 and 12, and screwing between the parts 14 and 10.

The ring 14 is provided with a notch 15 into which the end portion of the bundle is received in order to be cut. Lateral grooves 16 enable a gauge 17 to be placed inside the notch. The surface of said gauge 17 is machined so as to be cylindrical and co-axial to the rotor.

The part played by this gauge will be described in relation to how the shears work.

The upper part of the frame comprises an opening in which is fitted the pressure-bar 22 which can be moved by translation in the direction of arrow A. A magazine 21 containing the bundle of tubes 20 to be sheared, is secured to the pressure-bar. Said frame 1 comprises a portion 23 acting as counter-blade during the shearing operation.

To prevent the dust created by the fuel from spreading, a gas such as air or nitrogen is blown in through the tube 25. For the same reason, a joint 26 is inserted between the gate 4 and the frame 1, a joint 29 between the gate 2 and the frame 1, and a joint 31 between the frame 1 and the cutter-bar 12. A device, not shown, is provided to press on the upper end of the bundle of tubes and thus lower the bundle after each cutting operation.

The shears according to the first embodiment of the invention work as follows:

The pressure-bar 22 is brought into position above the notch 15. The gauge 17 is selected to be of adequate thickness so that the upper part of the cutter 19 is at the same height as the top part of the foot of the bundle when said foot touches the gauge 17. The motor is run over half a turn so that the cutter cuts off the foot of the tubes of the bundle, and over another half a turn to drive the cut part through the discharge 27. Then, the assembly 20, 21, 22 is moved to a position above the teeth 13, and the motor is run continuously at a speed between 1 and 10 turns per minute.

Figure 2:
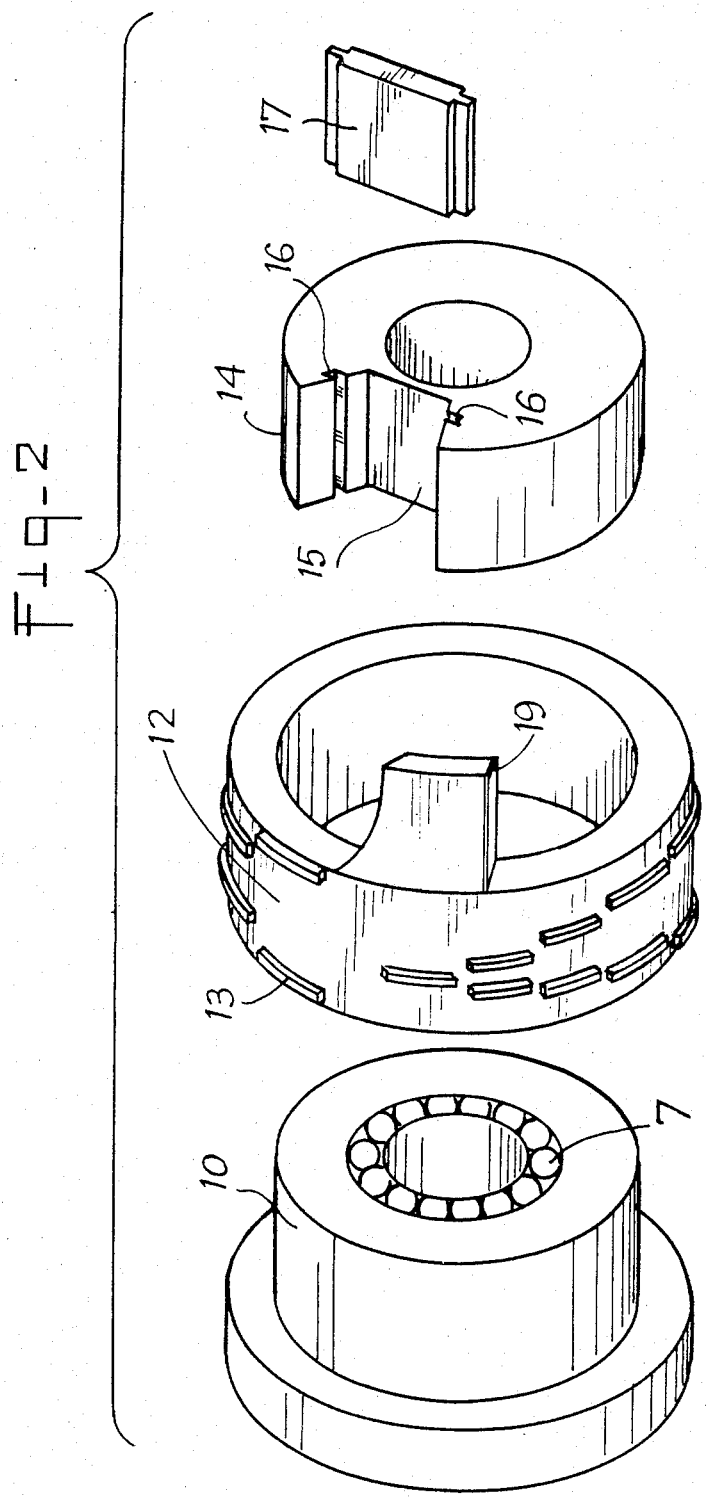
FIG. 2 is an exploded perspective view of the same embodiment showing the rotary part.

As shown in FIG. 2, the teeth are offset, the effect of this being that the bundle of tubes is sheared gradually. This system was selected after tests, over the system using a single straight tooth which would cut through the whole width. The circumferential length of the teeth is such that a set of teeth only attacks when the immediately preceding set has finished to cut the bundle: the developed length of the series of teeth is at least equal to the total width of the bundle of tubes.

When one set has completed its cutting operation, the device indicated hereinabove lowers the whole bundle over a height equal to the height of the teeth and the cutting operation is repeated by the next set of teeth.

FIG. 2 shows a cutter-bar comprising two sets of teeth divided into six stages, these numbers it is understood can vary, for example in relation to the dimensions of the tubes making up the bundles, or to the hardness of the metal constituting the tubes, and to other factors.

The teeth will be selected according to experience.

The sheared pieces of tubes accompany the rotor over half-a-turn and then fall through the discharge 28 into dissolving means (not shown). The discharges 27 and 28 shown in FIG. 1 are provided with hydraulic protections to prevent the contamination from spreading out, or the vapors from coming up from the dissolving equipment.

EXAMPLE 2

Description of a second embodiment of the shears according to the invention

The second embodiment differs from the first by a more thorough separation of the "clean" mechanical part of the shears from the "polluted" cutting part. To this effect, the cutting part has been mounted to overhang in order to keep it away from the ball races. This second embodiment is cross-sectionally illustrated in FIG. 3, where nearly all the same parts as in the first embodiment are found.

A frame 101 is closed at one end by a gate-plug 103 to which is secured a non-rotating shaft 105. The frame comprises a bore on which is fitted the sleeve 104. Inside said sleeve are housed two ball races 106.

The motor is composed of the coils 107 and of the rotor 102 which rotates inside the ball races 106 so that the cutting part overhangs in rotation. Tightness between the rear part and the cutting part is ensured by a joint 109.

The cuttng part is also simplified compared with that of the first embodiment, in that the ring 14 of the first embodiment shown in FIG. 1, is no longer separate from the rotor; the part 120 (front part of the rotor in FIG. 3) combines the parts 10 and 14 of FIG. 1 so that the notch 125 is made in the part 120.

Figure 3:
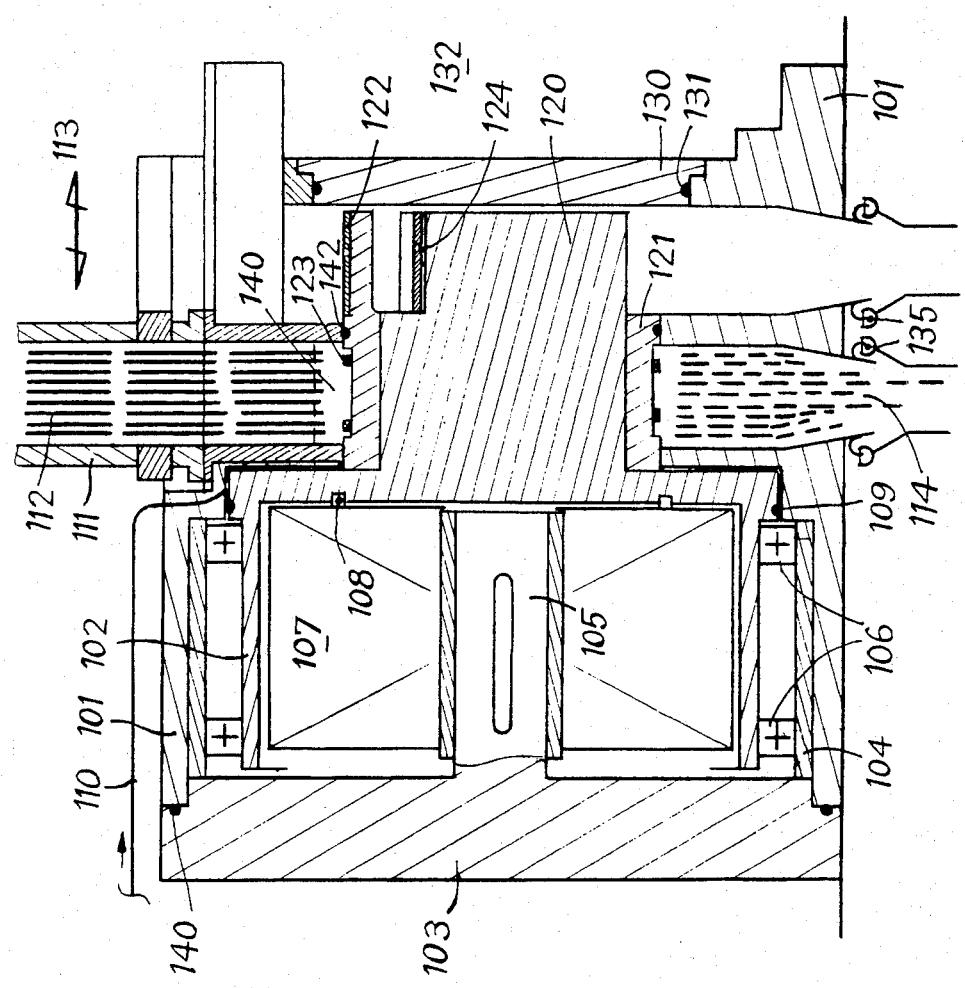
FIG. 3 shows a second embodiment of the shears according to the invention wherein the ball races are situated on the motor side so that the cutting part is overhung.

According to the second embodiment, the depth gauge 124, the cutter-bar 121, the bundle foot-cutting tooth 122 and the tube-cutting teeth 123 are unchanged. FIG. 3 also shows the bundle moving part III which has the same configuration as part 21 in the first embodiment. It will not therefore be described any further. And as in the first embodiment, the machine is isolated by hydraulic protections 135. Likewise, the front gate 130 comprises a tight joint 131 to prevent the dust from spreading out into the working cell 132, the lefthand gate carries the joint 141, and a joint 142 is inserted between the cutter-bar and the frame.

Figure 4:
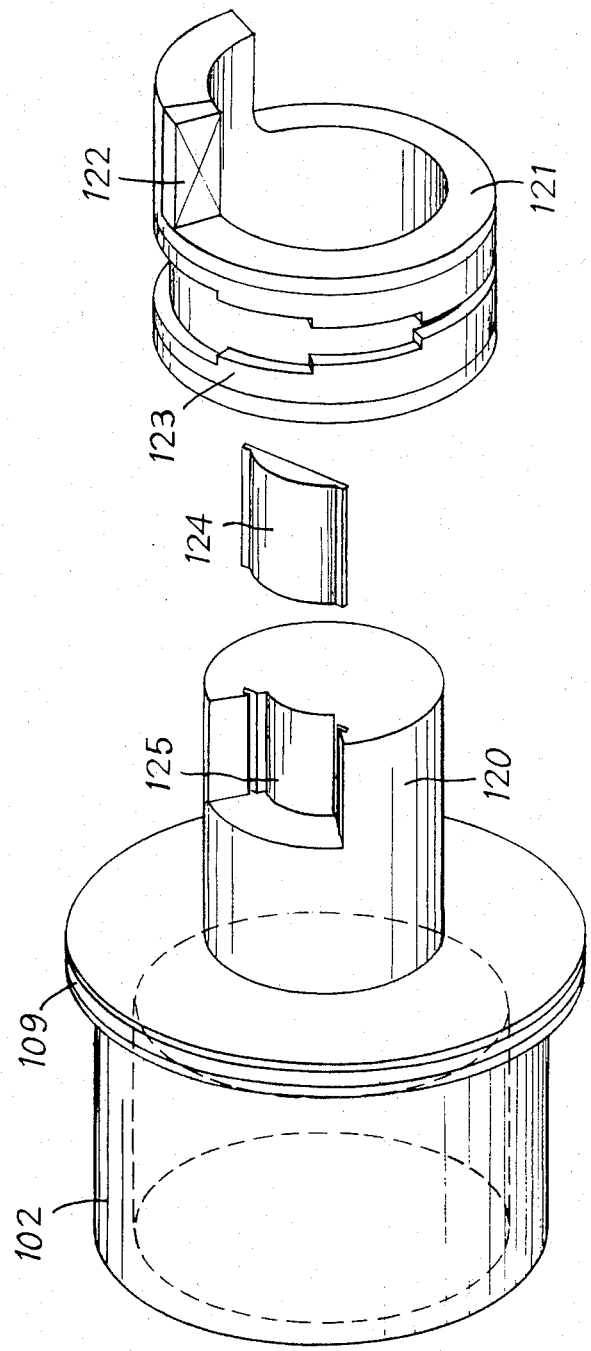
FIG. 4 is an exploded perspective view of the rotary part according to the second embodiment of the invention.
Figure 5:
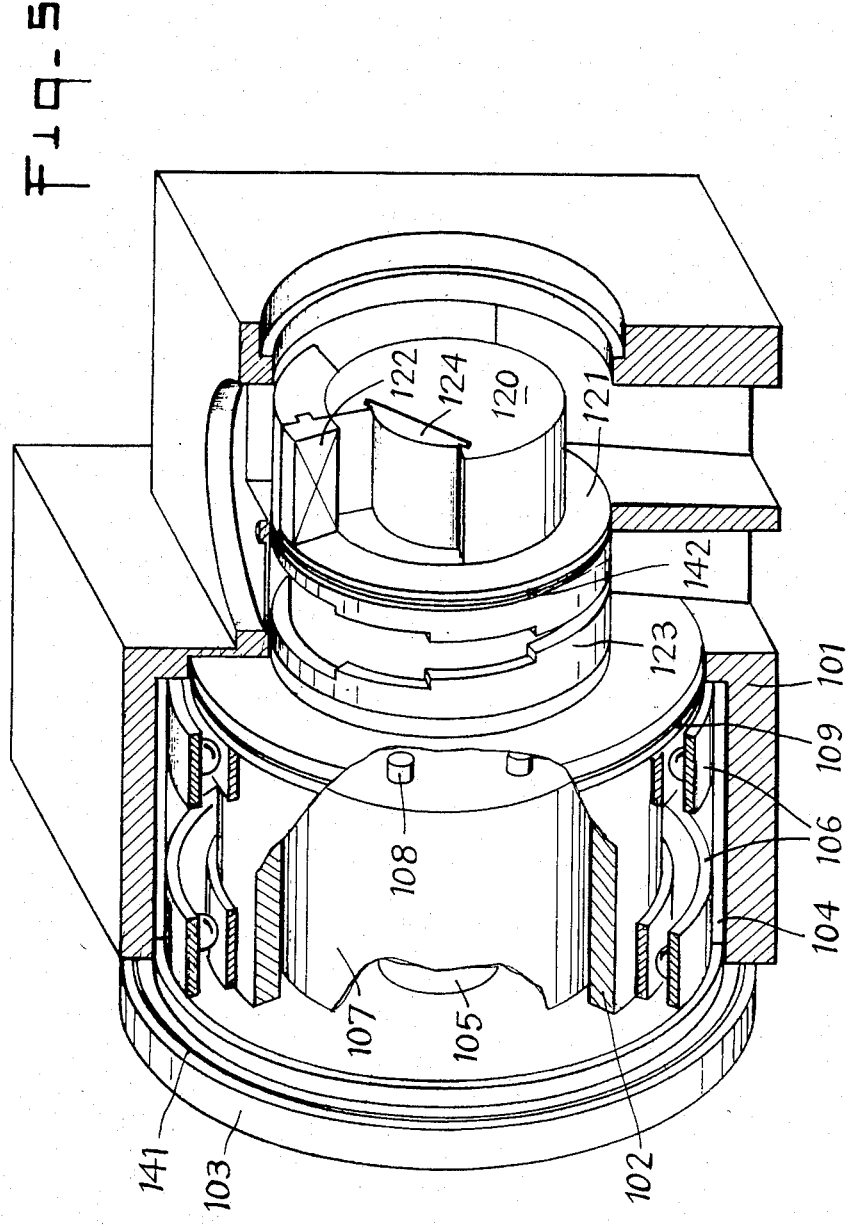
FIG. 5 is a perspective view with parts broken away of the second embodiment of the shears according to the invention.

FIGS. 2 and 4 illustrate the differences between the first and the second embodiments of the invention.

The second embodiment of the invention works in the same way as the first embodiment, as far as the cutting of the foot and the cutting of the tubes of the bundle are concerned. Obviously, the direction of rotation of the cutting elements will need to be adapted to the configuration of the series of teeth.

Both embodiments make use of the principle of displacement of the magazine by translation to pass from the foot-cutting operation to the tube-cutting operation.

Figure 6:
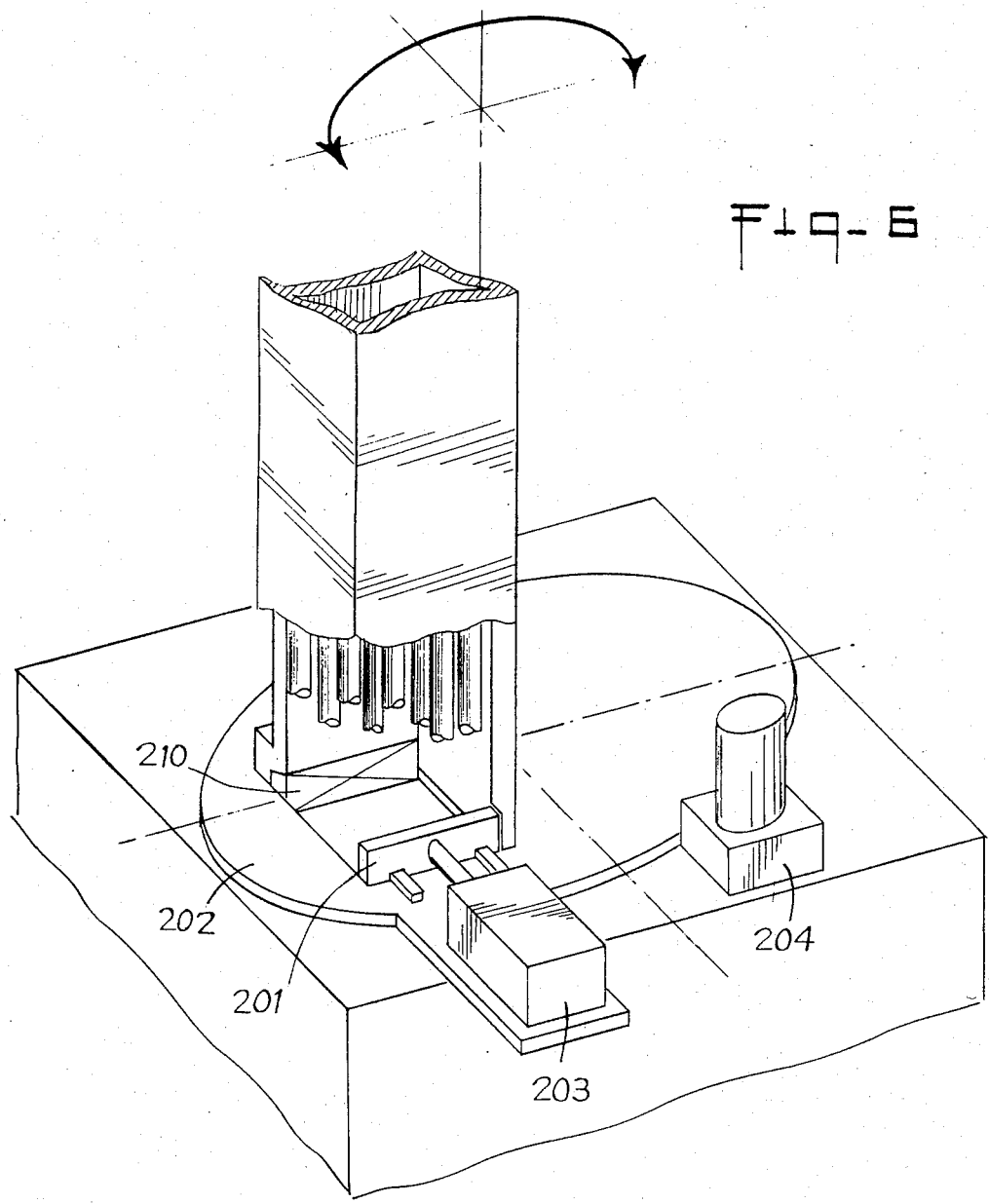
FIG. 6 is a perspective view with parts broken away of a machine in which the bundle carrying magazine is displaced by rotation.

FIG. 6 is a perspective illustrating a second embodiment of the means for displacing the bundle of tubes in which the pressure-bar 201 and the bundle-holder are mounted on a rotary plate 202. A jack 203 operates the pressure-bar and the counter-cutter 210 is also shown. This part of the mechanism has not been shown in FIGS. 1 and 3 for clarity's sake). In this special embodiment, the direction of rotation of the cutting element can be reversed, if necessary, (this will depend on the disposition of the teeth) between the cutting of the foot and that of the tubes.

The second embodiment of the invention shows a number of advantages over the first one. For example:

the complete separation of the mechanical part (comprising the motor and the bearings), from the cutting part (comprising the cutter-bar, the cutters and the teeth and the bundle supply), simplifies the mechanical operations to be conducted by the shears.

operations performed on the cutting part, namely the change of cutters or of teeth, are conducted on a polluted part but with possibility to intervene: for example, it is easy to dismount, by remote-manipulation, after dust-removing, the front gate 130 and the cutter-bar 121 to replace these with another cutter-bar with new cutters and teeth.

and to facilitate the remote-manipulation, it is advantageous to make the cutter-bar fast in rotation with the front part of the rotor by making male and female grooves on the two parts.

The present invention is in no way limited to the embodiments described and on the contrary covers any modifications that can be made thereto without departing from the scope thereof. For example, all the relative positions are possible, and it may be advantageous for space reasons heightwise, to place the bundle of tubes horizontally, whilst the axis of the shears can be horizontal or vertical.

What is claimed is:

1. Apparatus for removing first the foot and then successive lengths of the tubes of a bundle of tubes containing nuclear fuel, comprising:
   (a) means for supporting a bundle of tubes with the tubes in vertical position,
   (b) means for moving the bundle from a first position in which the foot of the bundle is removed to a second position in which sections of the tubes are successively removed,
   (c) means for cutting the foot of the bundle while it is in the first position, comprising:
      i. a horizontal shaft and a motor for rotating the shaft,
      ii. a ring connected to the shaft below the first position of the bundle and having a recess therein vertically aligned with the first position of the bundle to receive the lower end of the bundle,
      iii. a rotor on the shaft having a cutter bar extending axially therefrom overhanging the recess in the ring and operable when the lower end of the bundle is in the recess and the rotor is turned to sever the foot of the bundle, and
   (d) means for progressively removing sections of the tubes of the bundle while it is in the second position comprising:
      i. a circumferential series of teeth on the rotor positioned axially of said cutter bar and below the second position of the bundle and operable upon rotation of the rotor and positioning of the bundle in the second position to successively remove sections of the lower parts of the tubes as the bundle is lowered by gravity through said bundle moving means.

2. Apparatus according to claim 1, in which the circumferential series of teeth on the rotor begins with a centrally positioned circumferentially elongated single tooth followed by a series of circumferentially spaced pairs of axially spaced teeth, the teeth of each pair being axially spaced a greater distance than those of the adjacent pair in the direction opposite to the direction of rotation of the rotor.

3. Apparatus according to claim 2 in which each of the teeth is formed by a protruberance on the surface of the rotor.

4. Apparatus according to claim 2 in which each of the teeth is formed by notching the surface of the rotor.

5. Apparatus according to claim 1, comprising in addition:
   (a) a housing enclosing the motor and having an annular flange defining a central circular opening surrounding the rotor, and
   (b) ball races supporting the rotor on the shaft and positioned on the rotor side of the flange.

6. Apparatus according to claim 1, in which the rotor has a cylindrical extension, and ball races are positioned between the exterior of the cylindrical extension and the motor frame.

7. Apparatus according to claim 5 comprising, in addition, means for supplying a gas to the exterior surface of the rotor on the cutter side of the flange.

8. Apparatus according to claim 6 in which the cylindrical extension is integrally connected to the rotor by a radial flange, and comprising, in addition, means for supplying a gas to the surface of the rotor on the rotor side of the radial flange.

9. Apparatus according to claim 1, in which the motor is a low speed high torque motor.

10. Apparatus according to claim 1 in which the bundle is moved from its first to its second position by rotary movement.

* * * * *